US012619069B2

(12) United States Patent
Lin et al.

(10) Patent No.: US 12,619,069 B2
(45) Date of Patent: May 5, 2026

(54) SCHLIEREN SYSTEM FOR IN-SITU/ONLINE MONITORING OF SPATTER IN LARGE-AREA MELT POOL

(71) Applicant: WUHAN UNIVERSITY OF SCIENCE AND TECHNOLOGY, Wuhan (CN)

(72) Inventors: Xin Lin, Wuhan (CN); Kunpeng Zhu, Wuhan (CN); Haihong Zhu, Wuhan (CN); Xuefeng Chen, Wuhan (CN); Haodong Chen, Wuhan (CN)

(73) Assignee: WUHAN UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 18/956,055

(22) Filed: Nov. 22, 2024

(65) Prior Publication Data

US 2025/0314878 A1     Oct. 9, 2025

(30) Foreign Application Priority Data

Apr. 7, 2024     (CN) .......................... 202410410531.1

(51) Int. Cl.
G02B 27/54          (2006.01)
B23K 26/03          (2006.01)
          (Continued)

(52) U.S. Cl.
CPC .......... G02B 26/105 (2013.01); B23K 26/032 (2013.01); B23K 26/342 (2015.10);
          (Continued)

(58) Field of Classification Search
CPC .... G02B 26/105; G02B 27/54; B23K 26/032; B23K 26/342; B33Y 30/00; B33Y 50/02;
          (Continued)

(56)          References Cited

U.S. PATENT DOCUMENTS 10,994,337 B2 *   5/2021   Khairallah ............ B22F 10/368
2021/0331271 A1 *   10/2021   Nauka .................. B23K 26/032

FOREIGN PATENT DOCUMENTS

CN          100366374 C          2/2008
CN          113172242 A          7/2021

OTHER PUBLICATIONS

Andani et al, Spatter formation in selective laser melting process using multi-laser technology, Oct. 2017, Materials and Design, vol. 131, pp. 460-469 (Year: 2017).*

(Continued)

*Primary Examiner* — Michelle M Iacoletti
*Assistant Examiner* — Judy Dao Tran
(74) *Attorney, Agent, or Firm* — Nitin Kaushik

(57)          ABSTRACT

A schlieren system for in-situ/online monitoring of spatter in a large-area melt pool is provided, including a parallel light generation part, a parallel light deflection part, and an image acquisition part. The system can monitor spatter and other physical phenomena in the melt pool in a process of multi-layer printing and adjust a monitored area during an experiment to expand a monitored range. A reflector group composed of a plurality of plane mirrors is arranged, such that an optical path can be kept away from powder and dust areas, avoiding interference between the schlieren system and inherent devices inside a build chamber. Communication between a laser path controller and an optical path deflecting mirror galvanometer motor controller is established to automatically control the plane mirrors to change the monitored area, automatically track the melt pool, and realize online monitoring.

12 Claims, 8 Drawing Sheets

(51) Int. Cl.

| | |
|---|---|
| *B23K 26/342* | (2014.01) |
| *B33Y 30/00* | (2015.01) |
| *B33Y 50/02* | (2015.01) |
| *G01N 21/45* | (2006.01) |
| *G02B 26/10* | (2006.01) |
| *H04N 7/18* | (2006.01) |
| *H04N 23/55* | (2023.01) |

(52) U.S. Cl.
CPC ............... *B33Y 30/00* (2014.12); *B33Y 50/02* (2014.12); *G01N 21/455* (2013.01); *G01N 21/45* (2013.01); *G01N 2201/06113* (2013.01); *G01N 2201/0636* (2013.01); *G01N 2201/105* (2013.01); *G02B 27/54* (2013.01); *H04N 7/18* (2013.01); *H04N 23/55* (2023.01)

(58) Field of Classification Search
CPC ....... B33Y 10/00; B33Y 40/00; G01N 21/455; G01N 21/45; G01N 2201/06113; G01N 2201/0636; G01N 2201/105; H04N 7/18; H04N 23/55; Y02P 10/25; B22F 12/90; B22F 10/28; B22F 10/366
See application file for complete search history.

(56) References Cited

OTHER PUBLICATIONS

Anwar and Pham, Study of the spatter distribution on the powder ped during selective laser melting, Aug. 2018, Additive Manufacturing, vol. 22, pp. 86-97 (Year: 2018).*

Bidare et al, Fluid and particle dynamics in laser powder bed fusion, Jan. 2018, Acta Materialia, Jan. 2018, vol. 142, pp. 107-120 (Year: 2018).*

Lin et al, In situ defect detection in selective laser melting using a multi-feature fusion method, IFAC-PapersOnLine, 2023, pp. 4725-4732 (Year: 2023).*

Lin et al, Motion feature based melt pool monitoring for selective laser melting process, May 2022, Journals of Materials Processing Technology, vol. 303 (Year: 2022).*

Li et al, A Review of Spattering in Laser Powder Bed Fusion Additive Manufacturing: In Situ Detection, Generations, Effects, and Countermeasures, Aug. 2022, Micromachines, vol. 13 (Year: 2022).*

* cited by examiner

SCHLIEREN SYSTEM FOR IN-SITU/ONLINE MONITORING OF SPATTER IN LARGE-AREA MELT POOL

CROSS REFERENCE TO THE RELATED APPLICATIONS

This application is based upon and claims priority to Chinese Patent Application No. 202410410531.1, filed on Apr. 7, 2024, the entire contents of which are incorporated herein by reference.

TECHNICAL FIELD

The present disclosure relates to the technical field of laser additive manufacturing, and particularly relates to a large-area real-time monitoring schlieren imaging system for observing spatter and plumes in a melt pool formed by multi-layer scanning of selective laser melting.

BACKGROUND

Selective laser melting (SLM) is laser rapid prototyping technology commonly used in the field of laser additive manufacturing. Using laser as an energy source, the technology scans a metal powder bed layer by layer according to a path predefined in a 3D CAD slice model, and the scanned metal powder is melted and cured to achieve an effect of metallurgical bonding, and finally a metal part designed by the model is formed.

When the laser scans the metal powder bed, the metal powder will melt rapidly under the action of the laser to form a melt pool. During this process, many physical phenomena occur, such as heat conduction, heat convection, heat radiation, evaporation, and spatter, among which spatter directly affects the surface quality of a formed melt track. Therefore, it is essential to monitor the spatter occurred during a forming process of selective laser melting. By capturing images of the spatter, the forming process of spatter can be studied intuitively. A forming mechanism of spatter can be obtained through a large number of experiments, and appropriate measures can be taken to reduce or even eliminate the impact of spatter on the forming quality.

At present, two methods for monitoring the spatter in the melt pool are available. One is to employ a high-speed camera for direct shooting, followed by image processing and other means to extract spatter-related information. This method is relatively simple and easy-to-operate; however, it is very difficult for the high-speed camera to completely capture the spatter images due to different sizes and brightness of spatter. The other method is to employ a schlieren imaging device, which makes use of different propagation speeds of light in different media to make the spatter in a detection optical path develop at a specific position, and the high-speed camera is then used to capture images of spatter development. This method can clearly capture the forming and movement of spatter, but the conventional schlieren imaging device cannot monitor the spatter in the melt pool formed by multi-layer scanning due to movements of a scraper and spatial constraints, which limits further study on spatter in the melt pool formed through the selective laser melting. Furthermore, a monitored area is relatively narrow, preventing simultaneous observation of a large number of experimental groups. A chamber cannot be opened, a position of the schlieren imaging device cannot be readjusted or a build platform cannot be replaced until one monitoring session is completed, which increases experimental costs and makes it difficult to ensure consistency of conditions between successive experiments.

SUMMARY

In view of the deficiencies of the prior art, the present disclosure provides a large-area schlieren system for in-situ/online monitoring of spatter in a multi-layer scanning melt pool formed by selective laser melting, the system can capture images, such as spatter, plumes and the like, of the multi-layer scanning forming melt pool of selective laser melting in a printing chamber with limited space.

In order to achieve the above objective, the present disclosure adopts the following technical solution:

a schlieren system for in-situ/online monitoring of spatter in a large-area melt pool is used to monitor spatter phenomena in a melt pool on a selective laser melting build workbench, where the selective laser melting build workbench includes a powder reservoir, a build platform, and a powder collection bin arranged in sequence on a bottom surface of a printing chamber in a powder scraping direction y, as well as a laser emitter arranged above the build platform, the laser emitter is configured to be controlled by a laser galvanometer motor controller, and to make an emitted laser beam projected onto a designated position area of the build platform according to laser scanning path information outputted from a laser path planner, and then scans along a laser scanning path; and the schlieren system includes an optical source for generating an initial optical beam, and an optical beam guiding system composed of a fifth plane mirror, an optical path deflecting mirror and a reflector group; wherein the fifth plane mirror is configured to guide any of guiding optical beams reflected by the reflector group that has been reflected by the fifth plane mirror to form schlieren optical beams, which is perpendicular to the powder scraping direction y and a left-right direction x parallel to the bottom surface, passes through a sputtering area in close proximity to an upper surface of the build platform and then reaches a sixth plane mirror; a projection length of the fifth plane mirror in the powder scraping direction y is denoted as L1, wherein L1 is not less than a length L2 of the sputtering area in the powder scraping direction y; the sixth plane mirror is configured to guide the schlieren optical beams to be reflected to a lens group and then focused on a camera, a projection length L3 of the sixth plane mirror in the powder scraping direction y is not less than L2, and the fifth plane mirror and the sixth plane mirror are respectively arranged on a left/right side of the build platform in the left-right direction x the reflector group is composed of at least two reflectors capable of pivoting to change their directions, all of the reflectors are arranged on a mounting plane, and mirror surfaces of the reflectors are capable of pivoting around pivot axes perpendicular to the mounting plane; all of the reflectors, the optical path deflecting mirror and the fifth plane mirror are all arranged on a same side of the build platform, and when all of the reflectors are pivoted to a guiding angle, the mirror surfaces of the reflectors face between the optical path deflecting mirror and the fifth plane mirror, and the guiding optical beams reflected by all of the reflectors to the fifth plane mirror are all parallel;

the optical path deflecting mirror is configured to be capable of pivoting around an axis perpendicular to the mounting plane to a working position relatively parallel to one of the reflectors in the reflector group that has been pivoted to the guiding angle, such that the initial optical beam can be reflected to the one of the reflectors that has been pivoted to the guiding angle, and a projection distance from the axis of the optical path deflecting mirror to the build platform in a direction of any of the guiding optical beams is not greater than a projection distance from a pivot axis of any of the reflectors;

a synchronous controller, wherein the synchronous controller is in signal connection with the laser path planner; after receiving the laser scanning path information, the synchronous controller synchronously sends the laser scanning path information to the laser galvanometer motor controller and an optical path deflecting mirror galvanometer motor controller, and the optical path deflecting mirror galvanometer motor controller makes a mirror surface of the optical path deflecting mirror pivoted to the working position, such that any of the guiding optical beams that has been pivoted to the guiding angle after being reflected by the fifth plane mirror and then passes through the designated position area; and the reflectors are arranged in a following manner according to a position of the mounting plane:

when the mounting plane is one side wall of the printing chamber on the left or right side close to the fifth plane mirror in the powder scraping direction y, the side wall is parallel to the powder scraping direction y and forms an inclination angle greater than 0° but less than 180° with the bottom surface, in which case, the guiding angle refers to an angle αI of the mirror surface of each of the reflectors pivoted to the powder scraping direction y that is greater than 0° but less than or equal to 45°; and an order of the guiding angles of the mirror surfaces of all of the reflectors is opposite to an order of projection distances from the pivot axes of all of the reflectors along the guiding optical beams to the bottom surface; a projection length of a union set of all of the guiding optical beams in the powder scraping direction y is not less than L1; when being observed in the powder scraping direction y, projection distances from the pivot axes of all of the reflectors to an extension surface of the powder collection bin in the left-right direction x are all less than projection distances from the axis to the extension surface of the powder collection bin in the left-right direction x; when being observed in a direction of any of the guiding optical beam, projection distances from the pivot axes of all of the reflectors to the build platform are not less than the project distance from the axis of the optical path deflecting mirror to the build platform, a mirror surface of the fifth plane mirror is parallel to the powder scraping direction y, and the guiding optical beams and the schlieren optical beams are symmetrical relative to a normal vector of the mirror surface of the fifth plane mirror.

Optionally, when the mounting plane is the bottom surface, the mirror surface of the fifth plane mirror is perpendicular to the bottom surface, and the guiding optical beams and the schlieren optical beams are symmetrical relative to a normal vector of the mirror surface of the fifth plane mirror, and the direction of any of the guiding optical beams is same as the powder scraping direction y, in which case, the guiding angle refers to an angle αII of the mirror surface of each of the reflectors pivoted to the left-right direction x that is greater than 0° but less than or equal to 45°; an order of the guiding angles of the mirror surfaces of all of the reflectors is opposite to an order of projection distances from the pivot axes of all of the reflectors along the guiding optical beams to an extension part of the build platform in the left-right direction x, and a projection length of a union set of all of the guiding optical beams onto the fifth plane mirror in the left-right direction x is not less than a projection length L4 of the fifth plane mirror in the left-right direction x; in the direction of any of the guiding optical beams, a distance from the extension body of the build platform in the left-right direction x to the pivot axes of all of the reflectors is not less than a distance from the extension body of the build platform in the left-right direction x to the axis of the optical path deflecting mirror to the extension body of the build platform in the left-right direction x; when being observed in the left-right direction x, the extension part of build platform in the powder scraping direction y on the bottom surface is farther away from the reflector group than that of the axis of the optical path deflecting mirror; when being observed in the left-right direction x, the extension part of build platform in the powder scraping direction y on the bottom surface is closer to the reflector group than that of the axis of the optical path deflecting mirror.

Preferably, a direction of the initial optical beam incident on the optical path deflecting mirror is parallel to the guiding optical beams reflected by all of the reflectors.

Preferably, light from the optical source is provided by an optical source system consisting of an optical point source, a concave mirror and a first plane mirror, and light emitted from the optical point source reaches the optical path deflecting mirror after being reflected by the concave mirror and the first plane mirror.

Preferably, a straight-line distance between the optical point source and the concave mirror is a focal length of the concave mirror.

Preferably, the camera is mounted behind a focal point of the lens group.

When the side wall is parallel to the powder scraping direction y and perpendicular to the bottom surface, angles between the mirror surface of the fifth plane mirror relative to the side wall and the bottom surface are both 45°, the fifth plane mirror is abutted against the side wall, and the guiding optical beams are perpendicular to the bottom surface.

When the mounting plane is the bottom surface of the printing chamber, angles between the mirror surface of the fifth plane mirror and the left-right directions x, as well as the powder scraping direction y are both 45°, and the guiding optical beams are parallel to the powder scraping direction y Preferably, the schlieren optical beams are distributed continuously in the powder scraping direction y.

Further, the optical path deflecting mirror galvanometer motor controller is configured to search for and identify any of the reflectors in the reflector group, when being pivoted to the guiding angle, the any of the identified reflectors is capable of enabling the guiding optical beams after being reflected by the fifth plane mirror to pass through the designated position area corresponding to the laser scanning path; the optical path deflecting mirror galvanometer motor controller then controls the any of the identified reflectors to be pivoted to the guiding angle, and sends a motor rotation instruction according to a difference between a complementary angle of the guiding angle of the any of the identified reflectors and an angle of the mirror surface of the optical path deflecting mirror relative to a direction of any of the guiding optical beams, such that the optical path deflecting mirror is pivoted to be parallel to the mirror surface of the any of the identified reflectors being pivoted to the guiding angle.

the optical path deflecting mirror galvanometer motor controller is configured to search for a reflector, when being pivoted to the guiding angle, capable of making a guiding optical beam after being reflected by the fifth plane mirror pass through the designated position area according to the designated position area corresponding to the laser scanning path; the reflector after being identified is controlled by the optical path deflecting mirror galvanometer motor controller to be pivoted to the guiding angle, and the optical path deflecting mirror galvanometer motor controller sends a motor rotation instruction according to a difference between a complementary angle of the guiding angle of the identified reflector and an angle of the mirror surface of the optical path deflecting mirror relative to a direction of any of the guiding optical beams, such that the optical path deflecting mirror is pivoted to be parallel to the mirror surface of the identified reflector being pivoted to the guiding angle.

Further, when the angle $\alpha I$ between the mirror surface of any of the reflectors and the powder scraping direction y is equal to 45°, in the direction of any of the guiding optical beams, the project distance from the axis of the optical path deflecting mirror to the build platform is equal to a projection distance from the pivot axis of the reflector to the build platform; and when the angle $\alpha I$ between the mirror surface of any of the reflectors and the powder scraping direction y is less than 45°, in the direction of any of the guiding optical beams, a difference between a project distance from the pivot axis of the any of the reflectors to the build platform and the project distance from the axis of the optical path deflecting mirror to the build platform is denoted as H; and a distance from any of the guiding optical beams passing through the mirror surface emergent optical path center of the any of the reflectors to the initial optical beam passing through the mirror surface emergent optical path center of the optical path deflecting mirror is denoted as D, wherein H, D, and al satisfy the following formula:

$$H = \frac{D}{\tan 2\alpha I}.$$

Further, when the angle $\alpha II$ between the mirror surface of any of the reflectors and the powder scraping direction y is equal to 45°, in the powder scraping direction y, a projection distance from the axis of the optical path deflecting mirror to the extension body of the build platform in the left-right direction x is equal to a projection distance from the pivot axis the any of the reflectors to the extension body of the build platform in the left-right direction x; and when the angle $\alpha II$ between the mirror surface of any of the reflectors and the powder scraping direction y is equal to 45°, in the powder scraping direction y, a difference between a project distance from the pivot axis of the any of the reflectors to the build platform and the project distance from the axis of the optical path deflecting mirror to the build platform in the left-right direction x is denoted as H; and a distance from any of the guiding optical beams passing through the mirror surface emergent optical path center of the any of the reflectors to the initial optical beam passing through the mirror surface emergent optical path center of the optical path deflecting mirror is denoted as D, wherein H, D, and all satisfy the following formula:

$$H = \frac{D}{\tan 2\alpha II}.$$

Compared with the prior art, the present disclosure has the following beneficial effects:

1) The present disclosure overcomes the space limitation in the selective laser melting device and achieves the monitoring of spatter phenomena during multi-layer printing.

2) By introducing the optical beam deflecting device, the present disclosure can make reasonable use of the space, such that the optical beam will not be disturbed by the powder before passing through the area to be tested, and more accurate images can be captured.

3) The present disclosure can overcome the limitation of the monitored area of the traditional schlieren imaging system, avoid vibration and position errors caused by directly moving the plane mirrors to translate the optical path, and realize smooth and accurate translation of the optical path through the deflection of the plane mirrors.

4) In the single-layer printing, the laser will move to other areas after completing the printing in a specific area, and tracking and monitoring of the single-layer/multi-layer printing area are achieved by an automatic control system of the optical path deflecting mirror formed by the synchronous controller, the laser path controller and the optical path deflecting mirror galvanometer motor controller.

Figure 1:
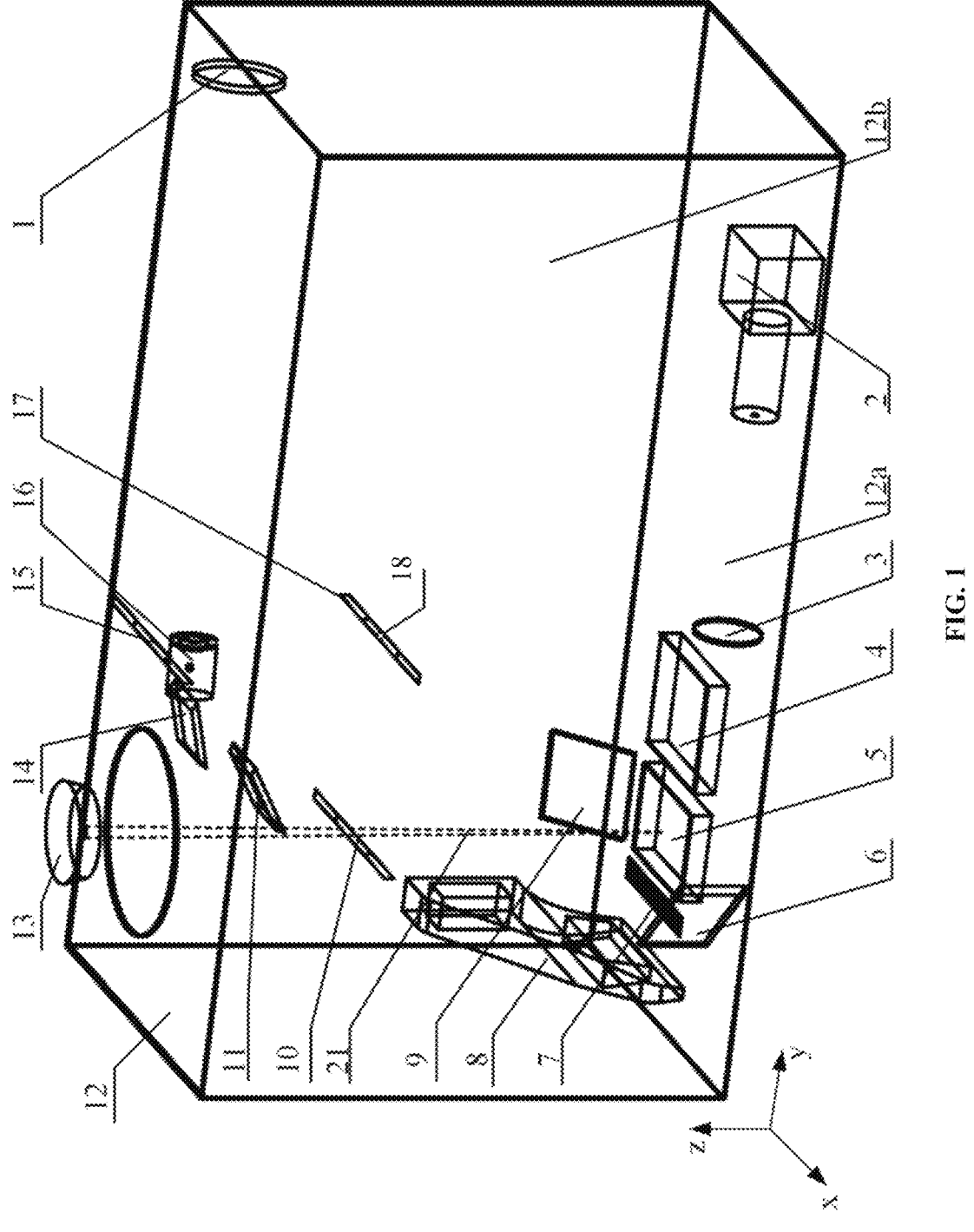
FIG. 1 is a schematic diagram of a schlieren system according to Example 1 of the present disclosure.

Reference numeral in the accompanying drawings: 1. concave mirror; 2. camera; 3. lens group; 4. powder reservoir; 5. build platform; 6. sixth plane mirror; 7. powder collection bin; 8. scraper; 9. fifth plane mirror; 10. fourth reflector; 11. third reflector; 12. printing chamber; 12*a*. bottom surface; 12*b*. side wall; 13. laser emitter; 14. second reflector; 15. first plane mirror; 16. optical point source; 17.

optical path deflecting mirror; 18. axis; 19*a*. guiding optical beam; 19*b*. schlieren optical beam; 19*c*. initial optical beam; 19*d*. conical optical beam; 19*e*. parallel optical beam; 20*a*, 20*b* and 20*c*. pivot axis; 21. laser beam; 22. laser galvanometer motor controller; 23. laser path planner; 24. synchronous controller; and 25. optical path deflecting mirror galvanometer motor controller.

DETAILED DESCRIPTION OF THE EMBODIMENTS

The present disclosure will be further described below in conjunction with the embodiments, the following embodiments are implemented based on this technical solution, and detailed implementation and specific operating procedures are provided, but the protection scope of the present disclosure is not limited to the following embodiments.

With reference to the accompanying drawings, a schlieren system for in-situ/online monitoring of spatter in a large-area melt pool is located in a printing chamber 12 provided with a selective laser melting build workbench, where the selective laser melting build workbench includes a powder reservoir 4, a build platform 5, a powder collection bin 7, a scraper 8, and a laser emitter 13. According to the technology described in Chinese Patent ZL202110457419.X, the powder reservoir 4, the build platform 5, and the powder collection bin 7 are located on a bottom surface of the printing chamber 12, the scraper 8 is capable of translating in a straight line, and sequentially passing through the powder reservoir 4, the build platform 5, and the powder collection bin 7, pushing metal powder flatly layer by layer from the powder reservoir 4 into the build platform 5, and then pushing excess metal powder flatly to the powder collection bin 7, and the laser emitter 13 is arranged above the build platform 5, and is configured to make an emitted laser beam 21 move on a surface of a melt pool composed of the metal powder in the build platform 5, such that the metal powder can be stacked layer by layer to fabricate a special-shaped dense metal part. According to the technology described in Chinese Patent ZL200610018754.5, the laser emitter 13 is driven by a laser galvanometer motor, a laser galvanometer motor controller 22 sends a control instruction to according to laser path coordinates to control the laser galvanometer motor to drive the laser emitter 13 to deflect, and a conversion of the laser path coordinates to the control instruction is built-in technology of the selective laser melting build workbench and cannot be expanded. The Chinese Patents ZL202110457419.X and ZL200610018754.5 are incorporated herein by reference.

It should be noted that the term "powder scraping direction y" in the present disclosure refers to a direction in which the scraper 8 translates in a straight line, and sequentially passes through directions of the powder reservoir 4, the build platform 5, and the powder collection bin 7.

As used herein, terms such as "bottom surface", "above", "left" and "right" can be used to describe the relationship between one element and another element, for example, the term "bottom surface" used herein can be used to describe planes of the powder reservoir 4, the build platform 5, and the powder collection bin 7 inside the printing chamber 12. Relative terms "left", "right", and the like used herein can be used to describe left and right sides of the powder scraping direction y relative to up and down directions. A "left-right direction x" can be used to describe a direction perpendicular to the powder scraping direction y and the up and down directions.

All angles between mirrors and light rays or planes in a coordinate system in the present disclosure are acute angles, unless otherwise specified.

As used herein, the term "projection length" can be used to describe a length of projection of an object onto another straight line or another plane in one particular direction. Specifically, it refers to a product of a length of a plane object and a cosine value of an angle in a direction of inclination relative to a particular direction when the plane object has the angle with the particular direction. Specifically, it also refers to a length of project of a collection of optical beams on a straight line or a plane in the particular direction.

As used herein, the term "projection distance" can be used to describe a distance between one object and another object in the particular direction, or a distance between an extending plane or an extending body of another object in another particular direction and one object in the particular direction. The extending plane or the extending body can be used to describe a plane or object extended in the another particular direction.

As used herein, the term "mirror surface normal vector" can be used to describe a vector perpendicular to a mirror surface and pointing to a space the mirror faces. As used herein, the term "mirror surface emergent optical path center" can be used to describe a center of the mirror surface.

As used herein, the term "in close proximity to" can be used to describe a spatial distance of 0-10 cm from a surface of a planar object; similarly, "sputtering" used herein can be used to describe a spatial range close to a surface of a planar object; and "sputtering area" can be used to describe a spatial area of 0-10 cm away from a surface of a planar object.

Example 1

As shown in FIG. 1, a schlieren system for in-situ/online monitoring of spatter in a large-area melt pool is used to monitor spatter phenomena in a melt pool on a selective laser melting build workbench, where the selective laser melting build workbench includes a powder reservoir 4, a build platform 5, and a powder collection bin 7 arranged in sequence on a bottom surface of a printing chamber 12 in a powder scraping direction y, as well as a laser emitter 13, the laser emitter 13 is configured to be controlled by a laser galvanometer motor controller 22, and to make an emitted laser beam 21 projected onto a designated position area of the build platform 5 according to laser scanning path information outputted from a laser path planner 23, and then scans along a laser scanning path.

Figure 4:
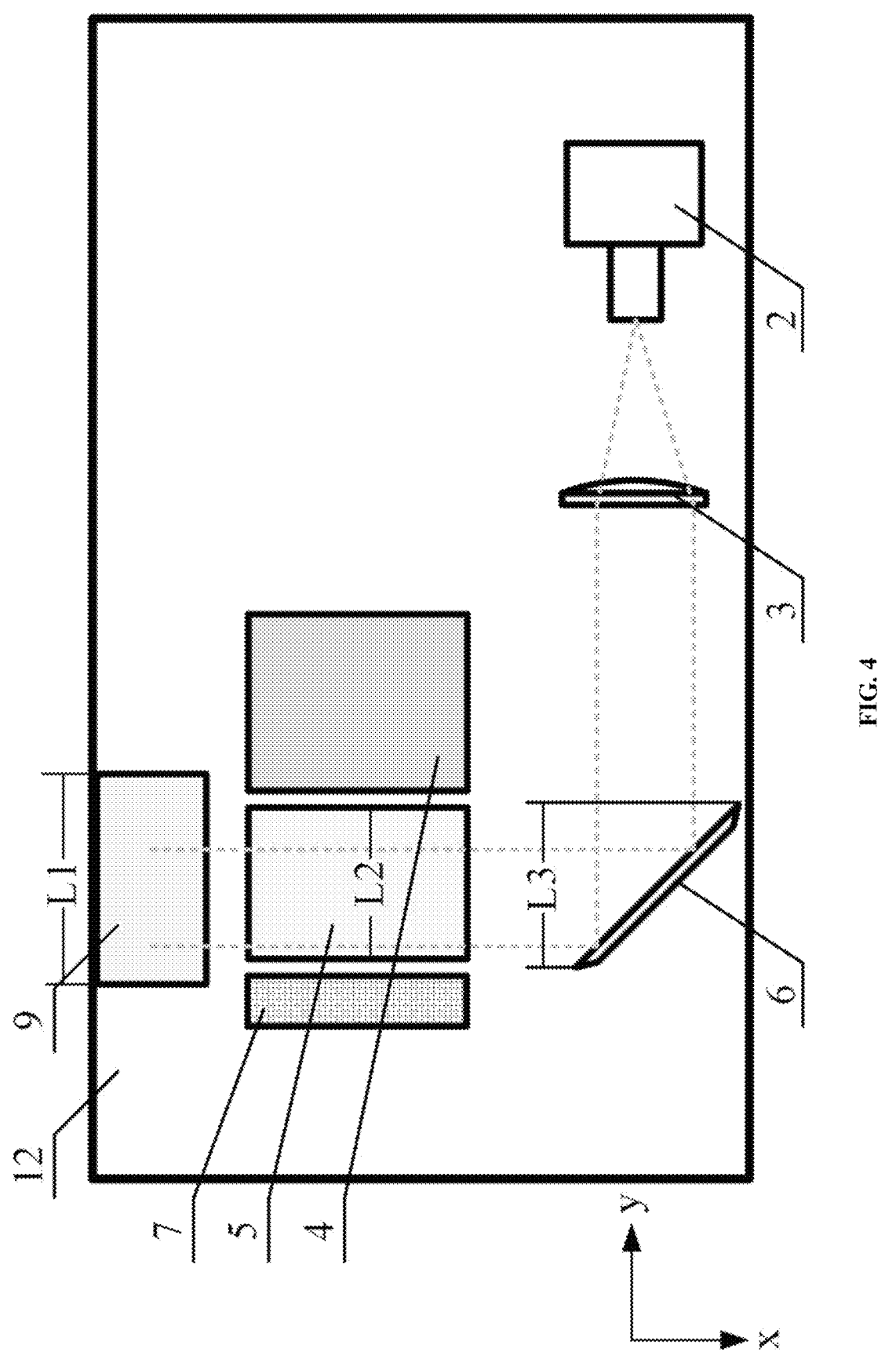
FIG. 4 is a schematic diagram of an image acquisition part of a schlieren system according to Example 1 of the present disclosure.

As shown in FIG. 4, the schlieren system includes a fifth plane mirror 9 and a sixth plane mirror 6, which are respectively fixedly arranged on a left or right side of the powder scraping direction y in left and right directions perpendicular to the powder scraping direction y and parallel to a bottom surface 12*a*, the sixth plane mirror 6 is configured to reflect guiding optical beams 19*a* reflected by any one of reflectors (10, 11, 14) in a reflector group that has been pivoted to a guiding angle αI, such that the guiding optical beams 19*a* are parallel to an upper surface of the build platform 5, and then pass through a sputtering area in close proximity to the upper surface of the build platform 5 to reach the sixth plane mirror 6. As shown in FIG. 4, a projection length L1 of the fifth plane mirror 9 in the powder scraping direction y is not less than a length L2 of the sputtering area in the powder scraping direction y; the sixth plane mirror 6 is configured to reflect schlieren optical beams 19*b* reflected by the fifth plane mirror 9 to be focused through a lens group 3 on a camera 2, and a projection length L3 of the sixth plane mirror 6 in the powder scraping direction y is not less than L2.

Figure 5:
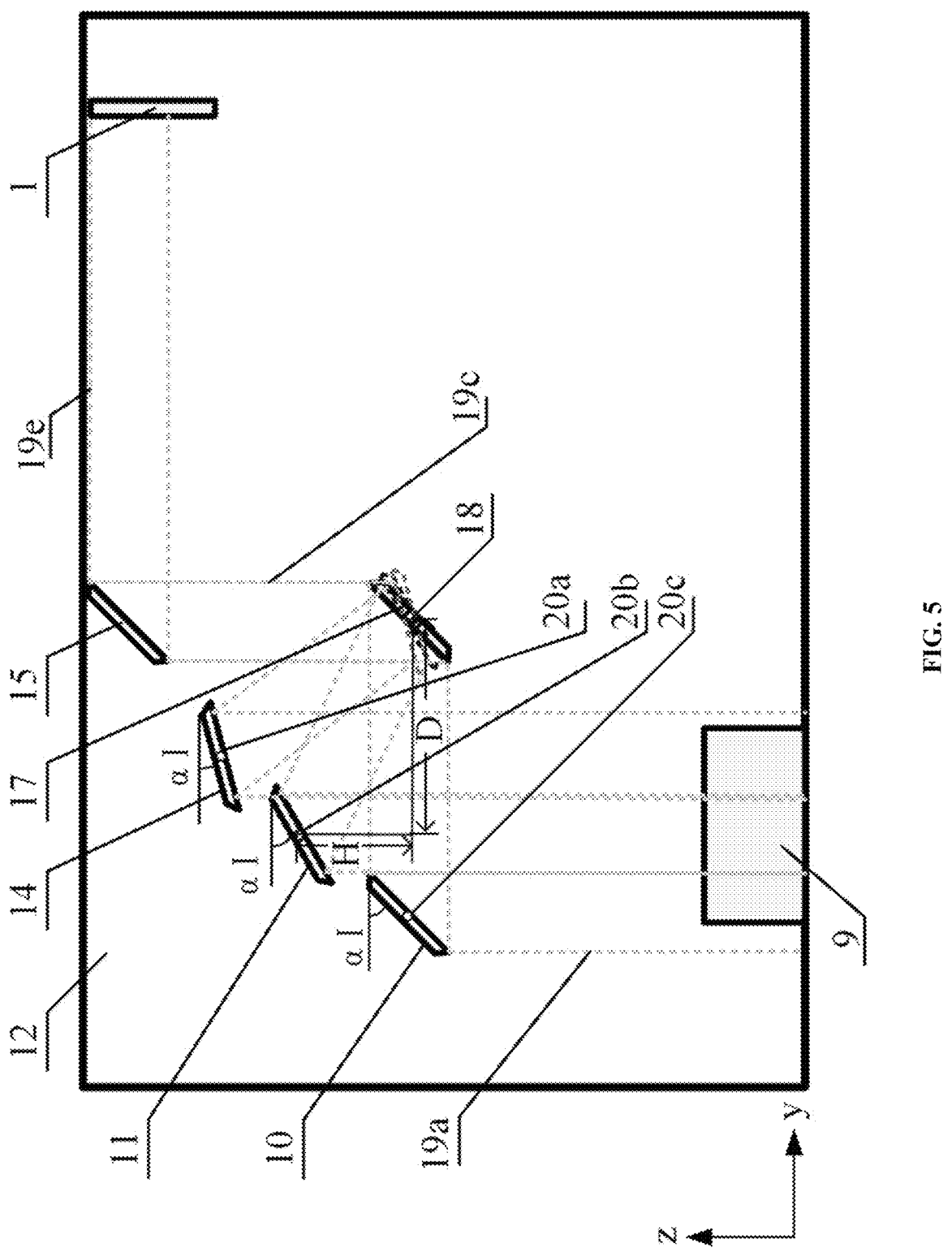
FIG. 5 is a schematic diagram of a parallel light deflection part of a schlieren system according to Example 1 of the present disclosure.

As shown in FIG. 5, the reflector group is composed of at least two reflectors capable of pivoting to change their directions. In this example, three reflectors (a fifth reflector 10, or a fourth reflector 11, or a second reflector 14) are arranged, all of the reflectors are arranged on a mounting plane, and mirror surfaces of the reflectors are perpendicular to the mounting plane; and all of the reflectors are capable of pivoting around a pivot axis perpendicular to the mounting plane to the guiding angle $\alpha$I (the guiding angle refers to an angle $\alpha$I at which mirror surfaces of the reflectors are pivoted relative to the powder scraping direction y). In this example, the mounting plane is one side wall 12*b* of the printing chamber 12 on the left or right side close to the fifth plane mirror 9 in the powder scraping direction y, the side wall 12*b* is parallel to the powder scraping direction y and perpendicular to the bottom surface 12*a*, all of the reflectors, the optical path deflecting mirror 17 and the fifth plane mirror 9 are all arranged on a same side (either the left side or the right side) of the build platform 5; and when all of the reflectors are pivoted to the guiding angle $\alpha$I, the mirror surfaces of the reflectors face between the optical path deflecting mirror 17 and the fifth plane mirror 9, and the guiding optical beams 19*a* reflected by all of the reflectors to the fifth plane mirror 9 are parallel.

In other implementing embodiments, the side wall 12*b* serving as the mounting plane needs to be parallel to the powder scraping direction y, but the side wall 12*b* is not required to be perpendicular to the bottom surface 12*a*, and the side wall 12*b* and the bottom surface 12*a* can form an inclination angle greater than 0° but less than 180°.

Figure 2:
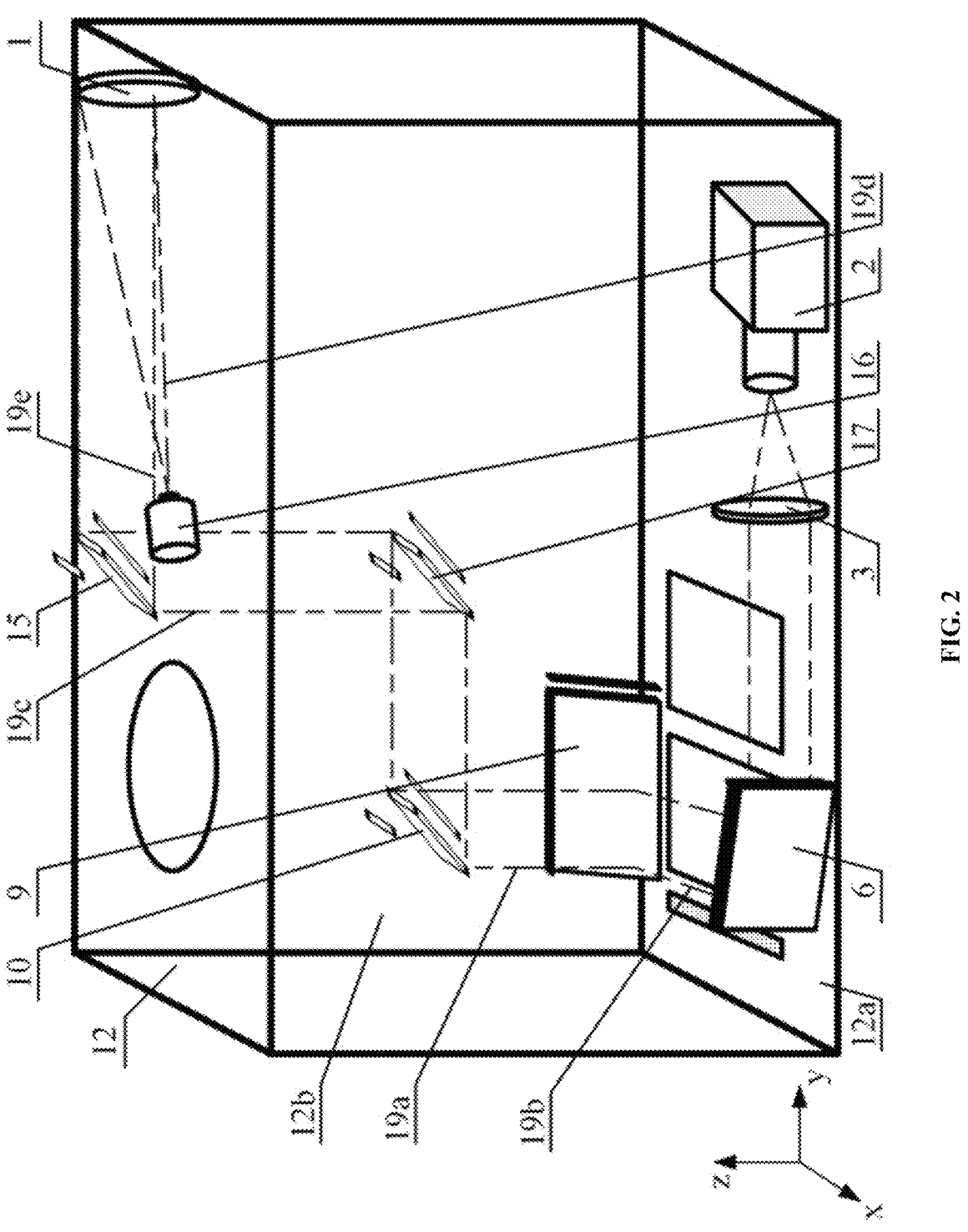
FIG. 2 is a schematic diagram of an optical path of a schlieren system according to Example 1 of the present disclosure.

In this example, the mounting plane of the reflector group on the left side of the build platform is taken as an example for further description, according to a structure of the printing chamber 12 shown in FIG. 1, an xyz axis coordinate system is established by taking the powder scraping direction y as a y-axis, a left-right direction x as an x-axis and a direction perpendicular to the bottom surface 12*a* as a z-axis to facilitate the description of the arrangement of the schlieren system. FIG. 2 shows one of optical path diagrams of the schlieren system in this example. The optical path deflecting mirror 17 of the schlieren system is controlled by an optical path deflecting mirror galvanometer motor controller 25 to pivot around an axis 18 perpendicular to the mounting plane, the optical path deflecting mirror 17 is capable of being rotated to a position parallel to one of the reflectors (the fifth reflector 10, or the fourth reflector 11, or the second reflector 14) in the reflector group that has been pivoted to the guiding angle $\alpha$I, and is configured to reflect an initial optical beam 19*c* from an optical source to the reflector parallel to the optical path deflecting mirror 17. As shown in FIG. 5, when any of the reflectors (the fifth reflector 10, or the fourth reflector 11, or the second reflector 14) is pivoted to the guiding angle $\alpha$I, a distance from a mirror surface emergent optical path center of any of the reflectors (the fifth reflector 10, or the fourth reflector 11, or the second reflector 14) to the build platform 5 in a direction of any of the guiding optical beams 19*a* reflected by any of the reflectors is not less than a distance from the axis 18 of the optical path deflecting mirror 17 to the build platform 5.

Figure 8:
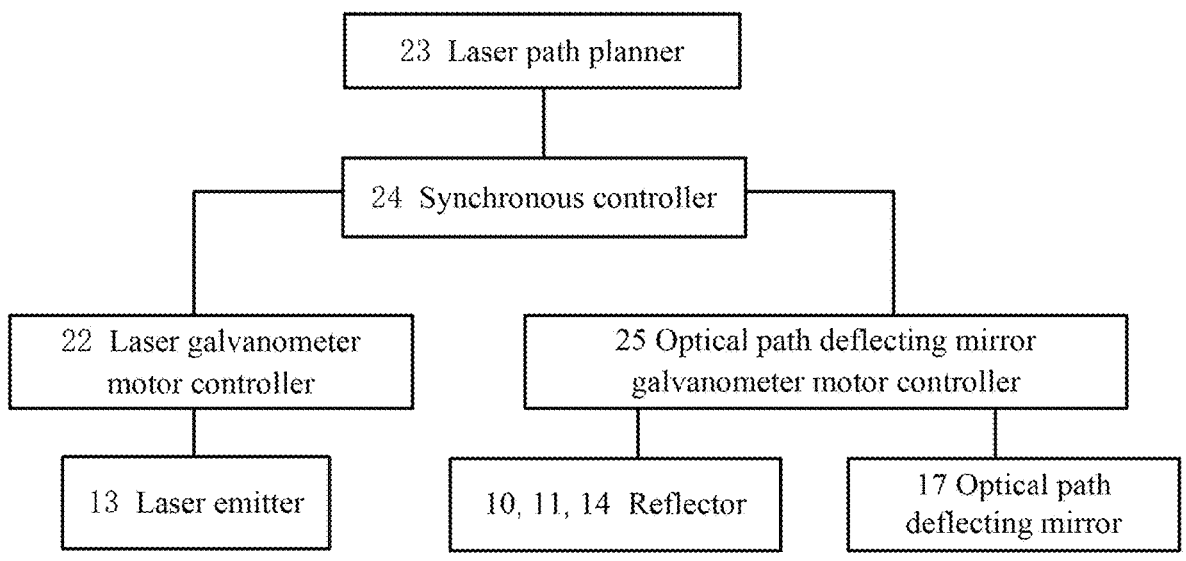
FIG. 8 is a schematic diagram of a control relationship between an optical beam guiding system and a laser transmitter control system according to the present disclosure.

As shown in FIG. 8, the optical path deflecting mirror galvanometer motor controller 25 is electrically connected to a synchronous controller 24, and the synchronous controller 24 is in signal connection with the laser path planner 23; after receiving the laser scanning path information, the synchronous controller 24 synchronously sends the same to the laser galvanometer motor controller 22 and the optical path deflecting mirror galvanometer motor controller 25, the laser galvanometer motor controller 22 then controls the laser emitter 13 to project the laser beam 21 to the designated position area on the build platform 5 and scan along the laser scanning path; and the optical path deflecting mirror galvanometer motor controller 25 makes the optical path deflecting mirror 17 deflected to a working position where a mirror surface of the same is parallel to one of the reflectors in the reflector group that has been pivoted to the guiding angle $\alpha$I, such that the guiding optical beam 19*a* is reflected by the fifth plane mirror 9 and then passes through the designated position area, where the guiding optical beam 19*a* is reflected by the reflector that is parallel to the mirror surface of the optical path deflecting mirror 17 and has been pivoted to the guiding angle $\alpha$I.

The initial optical beam 19*c* from the optical source is provided by an optical source system consisting of an optical point source 16, a concave mirror 1 and a first plane mirror 15. As shown in FIG. 2, the concave mirror 1 is irradiated by a conical optical beam 19*d* emitted from the optical point source 16, after being reflected by the concave mirror 1, the conical optical beam 19*d* is converted into a parallel optical beam 19*e* in the powder scraping direction y, and reflected by the first plane mirror 15 to the optical path deflecting mirror 17, then irradiated by the optical path deflecting mirror 17 onto any one of the reflectors (the fifth reflector 10, or the fourth reflector 11, or the second reflector 14, and the optical beam that the light irradiates on the fourth reflector 11, or the second reflector 14 is not shown in the figure) that has been pivoted to the guiding angle $\alpha$I, such that translation of the optical path is achieved; and after reaching the fifth plane mirror 9, the guiding optical beam 19*a* turns its direction and passes through the sputtering area, and the sixth plane mirror 6 reflects the schlieren optical beam 19*b* to make the same vertically pass through the lens group 3, making it focused and captured by the camera 2. The schlieren optical beams 19*b* that all of the reflectors reflect to the fifth plane mirror 9, and then to the sputtering area are distributed continuously in the powder scraping direction y.

It is conceivable that the initial optical beam 19*c* from the optical source can also be formed by the conical optical beam emitted from the optical point source 16, and reflected to the reflector group via the optical path deflecting mirror 17, and then directly irradiated onto the optical path deflecting mirror 17 in a direction of any of the guiding optical beams 19*a* of the reflector group.

As shown in FIG. 2, the parallel optical beam 19*e* emitted from the concave mirror 1 and the initial optical beam 19*c* incident on the optical path deflecting mirror 17 are symmetrical relative to a mirror surface normal vector of the first plane mirror 15. A straight-line distance between the optical point source 16 and the concave mirror 1 is a focal length of the concave mirror 1, and the camera 2 is mounted behind a focal point of the lens group 3. The guiding optical beam 19*a* and the schlieren optical beam 19*b* are symmetrical relative to a normal vector of the mirror surface of the fifth plane mirror 9. In FIG. 1, angles between a mirror surface of the fifth plane mirror 9 relative to the side wall and the bottom surface are both 45°, and the fifth plane mirror 9 is abutted against the side wall 12*b*.

As shown in FIG. 5, when the fifth reflector 10, the fourth reflector 11, and the second reflector 14 are pivoted to the guiding angle $\alpha$I, the angle $\alpha$II between the reflector surface of each of the reflectors and the powder scraping direction y is greater than 0° but less than and equal to 45°; when the angle between the fifth reflector 10 and the powder scraping direction y is equal to 45°, the distance from the axis 18 of the optical path deflecting mirror 17 to the build platform 5 in the direction of any of the guiding optical beams 19a of the fifth plane mirror 9 is equal to the distance from a mirror surface emergent optical path center of the fifth reflector 10 to the build platform 5, such that the guiding optical beam 19a of the fifth reflector 10 is parallel to the left-right direction x and can completely pass through the sputtering area; when the angles between the fourth reflector 11, as well as the second reflector 14, and the powder scraping direction y are less than 45°, a difference between a projection distance from a mirror surface emergent optical path center of the fourth reflector 11 or the second reflector 14 to the build platform, as well as the axis 18 of the optical path deflecting mirror 17 in the directions of the guiding optical beams 19a of the fourth reflector 11 or the second reflector 14, and to the build platform 5, is denoted as H, and a distance from the guiding optical beams 19a passing through the mirror surface emergent optical path center of the fourth reflector 11 or the second reflector 14 to the initial optical beam 19c passing through the mirror surface emergent optical path center of the optical path deflecting mirror 17 is denoted as D, where H, D, and al satisfy the following formula:

$$H = \frac{D}{\tan 2al}.$$

The guiding angles αI of the fifth reflector 10, the fourth reflector 11, and the second reflector 14 are sorted in descending order, distances from the mirror surface emergent optical path centers of the fifth reflector 10, the fourth reflector 11, and the second reflector 14 to the bottom surface 12a are sorted in ascending order, a projection length of a union set of the guiding optical beams 19a reflected by all of the reflectors in the powder scraping direction y is not less than L1, and projection distances from the mirror surface emergent optical path centers of all of the reflectors in the powder scraping direction y to the powder collection bin 7 are all less than projection distances from the axis 18 to the powder collection bin 7, such that the second reflector 14 does not block the optical path from the first plane mirror 15 to the optical path deflecting mirror 17.

Figure 3:
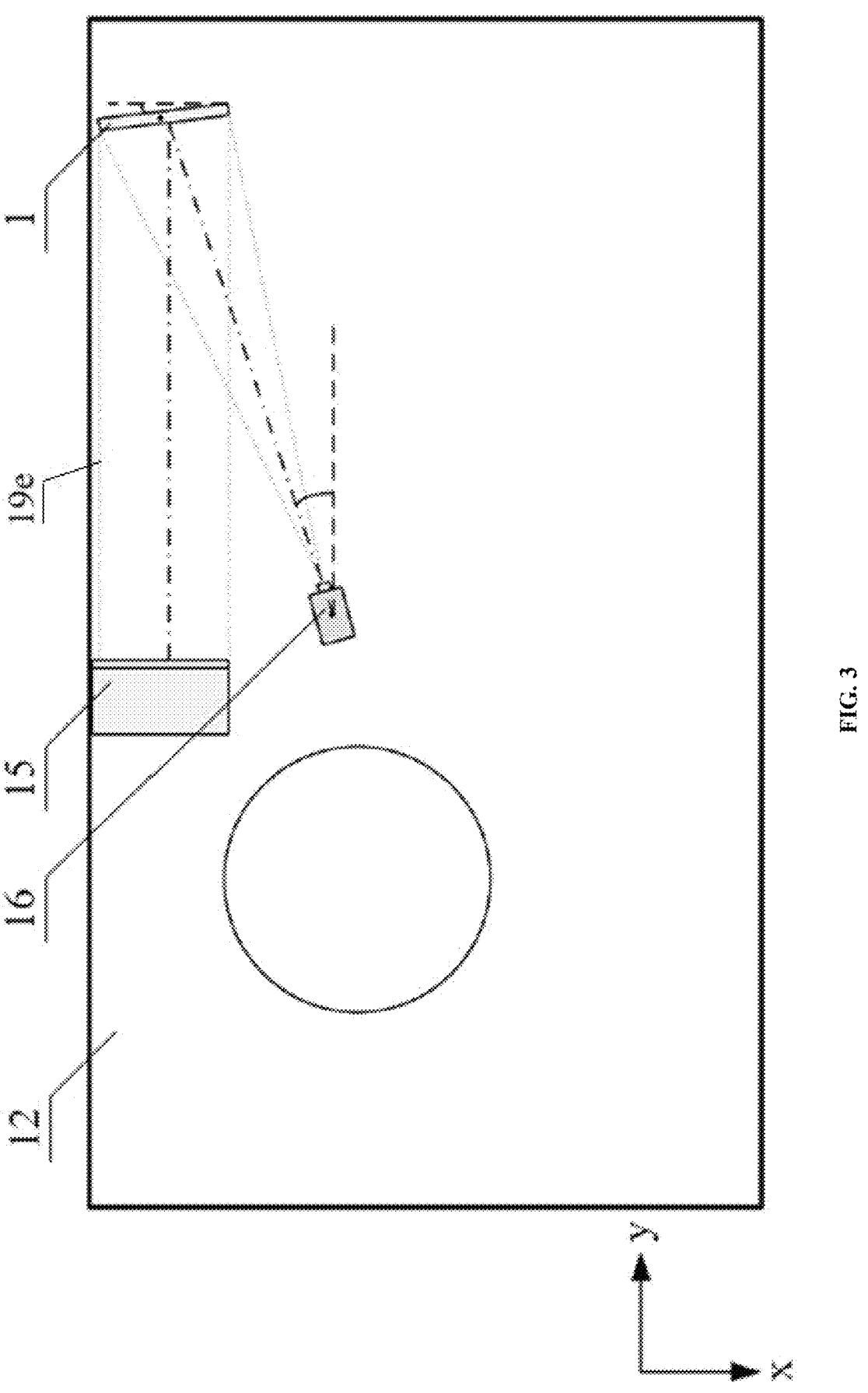
FIG. 3 is a schematic diagram of a parallel light generation part of a schlieren system according to Example 1 of the present disclosure.

Specifically, a method for in-situ/online monitoring of spatter in a large-area melt pool by the schlieren system includes the following steps:

Step 1. according to the positions shown in FIG. 3, the optical point source 16 and the concave mirror 1 are mounted on a top inner wall of the printing chamber 12 that is parallel to an xy plane, center positions of the optical point source 16 and the concave mirror 1 are at a same horizontal height, an angle between the conical optical beam 19d emitted from the optical point source 16 and a negative y-axis direction is 10°, and an angle between a mirror surface normal vector of the concave mirror 1 and a positive y-axis direction is 5°, such that a laser pen can be used to check whether the parallel optical beam 19e reflected by the concave mirror 1 is parallel to the y-axis. A straight-line distance between the optical point source 16 and the concave mirror 1 is a focal length of the concave mirror 1. Angles of the concave mirror 1 and the optical point source 16 are adjusted until the direction of the parallel optical beam 19e emitted from the concave mirror 1 is same as the negative y-axis direction.

Step 2. the first plane mirror 15, the second reflector 14, a third reflector 11, the fourth reflector 10, and the optical path deflecting mirror 17 are mounted in the positions shown in FIG. 5, specifically, the first plane mirror 15, the second reflector 14, the third reflector 11, and the fourth reflector 10 are mounted on the side wall 12b of the printing chamber 12, and mirror surfaces of the first plane mirror 15, the second reflector 14, the third reflector 11, and the fourth reflector 10 are all perpendicular to a yz plane.

The mirror surface normal vector of the first plane mirror 15 has an angle of 45° with the positive y-axis direction, such that the emitted initial optical beam 19c is parallel to the z-axis; and the optical path deflecting mirror 17 is controlled by the optical path deflecting mirror galvanometer motor controller 25, a mirror surface of the optical path deflecting mirror 17 is perpendicular to a yz plane, and the optical path deflecting mirror 17 is capable of rotating around the x-axis.

Centers of the optical path deflecting mirror 17 and the first plane mirror 15 are projected at a same position on the y-axis, the mirror surfaces of the second reflector 14, the third reflector 11, and the fourth reflector 10 that have been pivoted to the guiding angle αI have angles of 15°, 30° and 45° respectively with the positive y-axis direction, and directions of the guiding optical beams 19a reflected by the second reflector 14, the third reflector 11, and the fourth reflector 10 are the same as the negative direction of the z-axis.

Before passing through the sputtering area, the schlieren optical beams 19b adjusted through the schlieren system are not disturbed by a sputtering plume in the selective laser melting process, which improves the monitoring accuracy. In addition, thanks to the translatable monitoring optical path, sputtering, plume and other phenomena of the entire build platform can be monitoring without opening the printing chamber.

Specifically, the optical path deflecting mirror galvanometer motor controller 25 is configured to search for and identify any of the reflectors in the reflector group, when being pivoted to the guiding angle αI, the any of the identified reflectors is capable of enabling the guiding optical beams 19a after being reflected by the fifth plane mirror 9 to pass through the designated position area corresponding to the laser scanning path; the optical path deflecting mirror galvanometer motor controller 25 then controls the any of the identified reflectors to be pivoted to the guiding angle, and sends a motor rotation instruction according to a difference between a complementary angle of the guiding angle αI of the any of the identified reflectors and an angle of the mirror surface of the optical path deflecting mirror 17 relative to a direction of any of the guiding optical beams, such that the optical path deflecting mirror 17 is pivoted to be parallel to the mirror surface of the any of the identified reflectors being pivoted to the guiding angle αI.

Step 3: the fifth plane mirror 9 is mounted on the bottom surface 12a of the printing chamber 12, a mirror surface of the fifth plane mirror 9 is perpendicular to the xz plane, the mirror surface of the fifth plane mirror 9 forms an angle of 45° with the positive direction of the z-axis, ensuring that a direction of the schlieren optical beam 19b emitted from the fifth plane mirror 9 is the same as the positive x-axis direction; a width of the schlieren optical beam 19b emitted from the fifth plane mirror 9, that is, the projection length L1 of the schlieren optical beam onto the y-axis, is greater than the projection length L2 of the sputtering area of the build platform onto the y-axis, such that the conical optical beam 19d emitted from the optical point source 16, and the schlieren optical beam 19b reflected or refracted by the concave mirror 1, the first plane mirror 15, the optical path deflecting mirror 17, the second reflector 14 or the third reflector 11 or the fourth reflector 10, and the fifth plane mirror 9 can pass through the build platform 5 close to a surface of the same. Further, the projection length of a bottom edge line of the fifth plane mirror 9 onto the y-axis must be less than a sum of the projection lengths of edge lines of the second reflector 14, the third reflector 11, and the fourth reflector 10 away from the side wall of the printing chamber 12 onto the y-axis.

Step 4: as shown in FIG. 4, the sixth plane mirror 6 is mounted on the bottom surface 12a of the printing chamber 12, a mirror surface of the sixth plane mirror 6 is perpendicular to the xy plane, and the mirror surface of the sixth plane mirror 6 forms an angle of 45° with the negative y-axis direction, such that a direction of the emergent optical path is the same as the positive y-axis direction to facilitate arrangement of subsequent devices. Further, the projection length L3 of the schlieren optical beam 19b incident on the sixth plane mirror 6 in the y-axis direction is greater than the projection length L2 of the sputtering area of the build platform 5 on the y-axis.

Step 5: the lens group 3 is mounted on the bottom surface 12a of the printing chamber 12, as shown in FIG. 4, a lens surface of the lens group 3 is perpendicular to the xy plane, a concave side of the lens group is an optical incident surface, a convex side thereof is optical emergent surface, which can eliminate spherical aberration caused by spherical lenses, and further improves the clarity of the collected images. A position of the lens group 3 is adjusted to enable it to completely cover a projection area of the sixth plane mirror 6 on the xz plane.

Step 6: the camera 2 is mounted behind a focal point of the lens group 3, and a blade is used to cut the light at the focal point (not shown in the figure); and the camera 2 is a high-speed camera used to capture phenomena such as sputtering and plumes, a lens height of the camera 2 is consistent with a focal height of lens group 3 for facilitating image capture.

In this example, the second reflector 14, the third reflector 11, and the fourth reflector 10 can be configured to pivot around pivot axes (20a, 20b, 20c) perpendicular to the mounting plane, and a specific implementation route of optical path translation includes:

1) The fourth reflector 10 covers a left area of the build platform 5 (a side of the build platform close to the scraper is denoted as the left area), the optical path deflecting mirror 17 is rotated to form an angle of 45° with the xy plane, a mirror surface of the fourth reflector 10 forms an angle of 45° with the xy plane, and mirror surfaces of the second reflector 14 and the third reflector 11 are rotated to be parallel to the xz plane.

2) The third reflector 11 covers a middle area of the build platform, the optical path deflecting mirror 17 is rotated to form an angle of 30° with the xy plane, the mirror surface of the third reflector 11 forms an angle of 30° with the xy plane, and the mirror surfaces of the second reflector 14 and the fourth reflector 10 are parallel to the xz plane.

3) The second reflector 14 covers a right area of the build platform (a side of the build platform away from the scraper is denoted as the right area), the optical path deflecting mirror 17 is rotated to form an angle of 15° with the xy plane, the mirror surface of the second reflector 14 forms an angle of 15° with the xy plane, and mirror surfaces of the third reflector 11 and the fourth reflector 10 are parallel to the xz plane.

4) As shown in FIG. 5, the three sets of parallel optical paths should have an overlapping area.

During testing, the optical point source 16 is turned on, and ignited with a lighter in a test area, and airflow above the flame can be observed through the camera. The printing chamber is closed 12 until the experiment is completed; in this process, pivots of the second reflector 14, the third reflector 11, the fourth reflector 10, and the optical path deflecting mirror 17 are automatically controlled by the optical path deflecting mirror galvanometer motor controller.

Example 2

Figure 6:
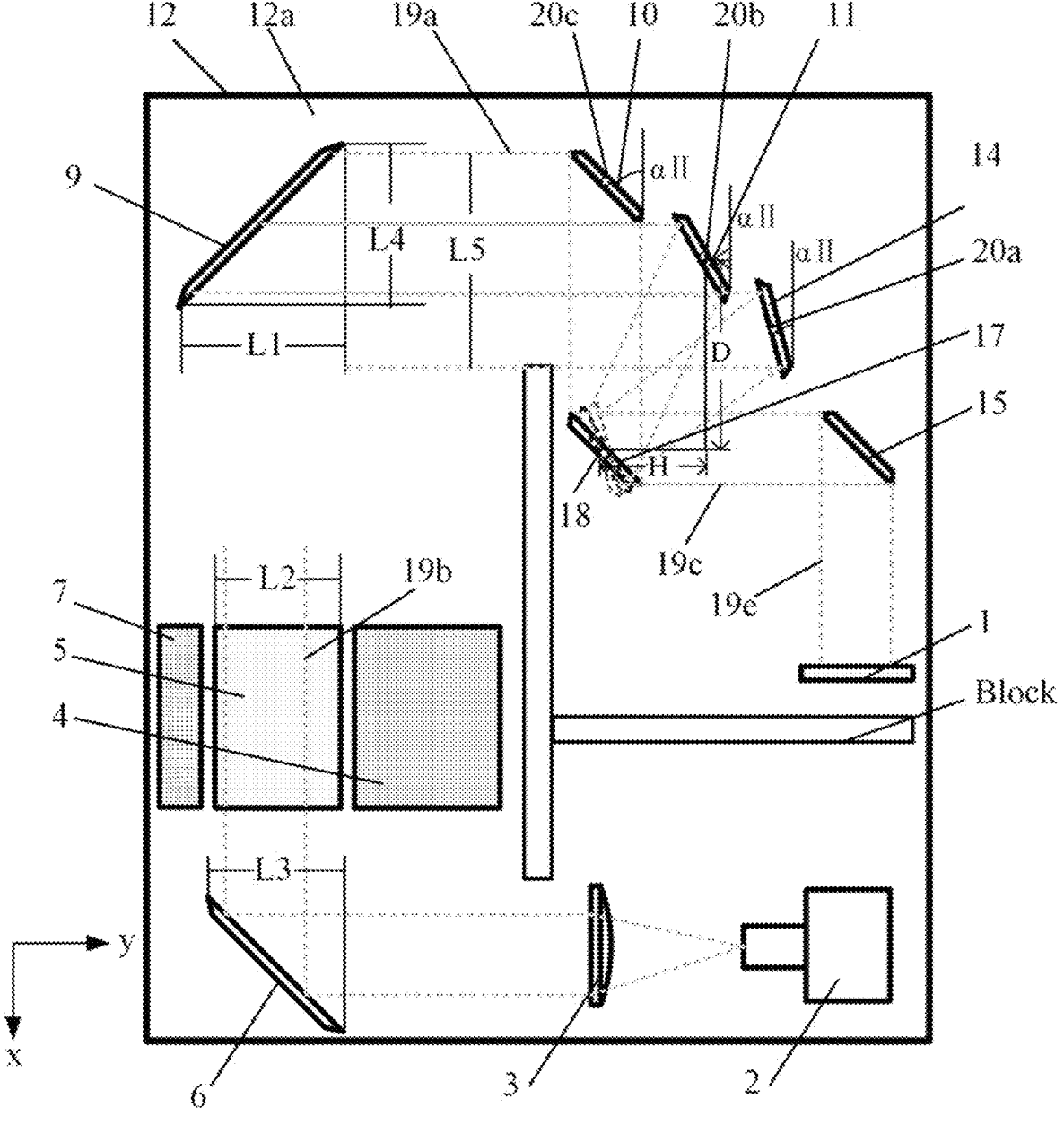
FIG. 6 is a first layout diagram of a reflector group in a schlieren system according to Example 2 of the present disclosure, where an optical path deflecting mirror is closer to a build platform than a reflector group in a left-right direction x.

As shown in FIG. 6, a schlieren system for in-situ/online monitoring of spatter in a large-area melt pool is used to monitor spatter phenomena in a melt pool on a selective laser melting build workbench, where the selective laser melting build workbench includes a powder reservoir 4, a build platform 5, and a powder collection bin 7 arranged in sequence on a bottom surface of a printing chamber 12 in a powder scraping direction y, as well as a laser emitter 13, the laser emitter 13 is configured to be controlled by a laser galvanometer motor controller 22, and to make an emitted laser beam 21 projected onto a designated position area of the build platform 5 according to laser scanning path information outputted from a laser path planner 23, and then scans along a laser scanning path.

The schlieren system includes a fifth plane mirror 9 and a sixth plane mirror 6, which are respectively fixedly arranged on a left or right side of the powder scraping direction y in left and right directions perpendicular to the powder scraping direction y and parallel to a bottom surface 12a, the sixth plane mirror 6 is configured to reflect guiding optical beams 19a reflected by any one of reflectors (10, 11, 14) in a reflector group that has been pivoted to a guiding angle αII, such that the guiding optical beams 19a are parallel to an upper surface of the build platform 5, and then pass through a sputtering area in close proximity to the upper surface of the build platform 5 to reach the sixth plane mirror 6. A projection length L1 of the fifth plane mirror 9 in the powder scraping direction y is not less than a length L2 of the sputtering area in the powder scraping direction y; the sixth plane mirror 6 is configured to reflect schlieren optical beams 19b reflected by the fifth plane mirror 9 to be focused through a lens group 3 on a camera 2, and a projection length L3 of the sixth plane mirror 6 in the powder scraping direction y is not less than L2.

The reflector group is composed of at least two reflectors capable of pivoting to change their directions. In this example, three reflectors (a fifth reflector 10, or a fourth reflector 11, or a second reflector 14) are arranged, all of the reflectors are fixed on a mounting plane, and mirror surfaces of the reflectors are perpendicular to the mounting plane; and all of the reflectors are capable of pivoting around a pivot axis perpendicular to the mounting plane to the guiding angle αII (the guiding angle refers to an angle αII at which mirror surfaces of the reflectors are pivoted relative to a left-right direction y). In this example, the mounting plane is the bottom surface 12a of the printing chamber 12, all of the reflectors, an optical path deflecting mirror 17 and the fifth plane mirror 9 are all arranged on a same side (either the left side or the right side) of the build platform 5; and when all of the reflectors are pivoted to the guiding angle αII, the mirror surfaces of the reflectors face between the optical path deflecting mirror 17 and the fifth plane mirror 9, and the guiding optical beams 19*a* reflected by all of the reflectors to the fifth plane mirror 9 are parallel.

Figure 7:
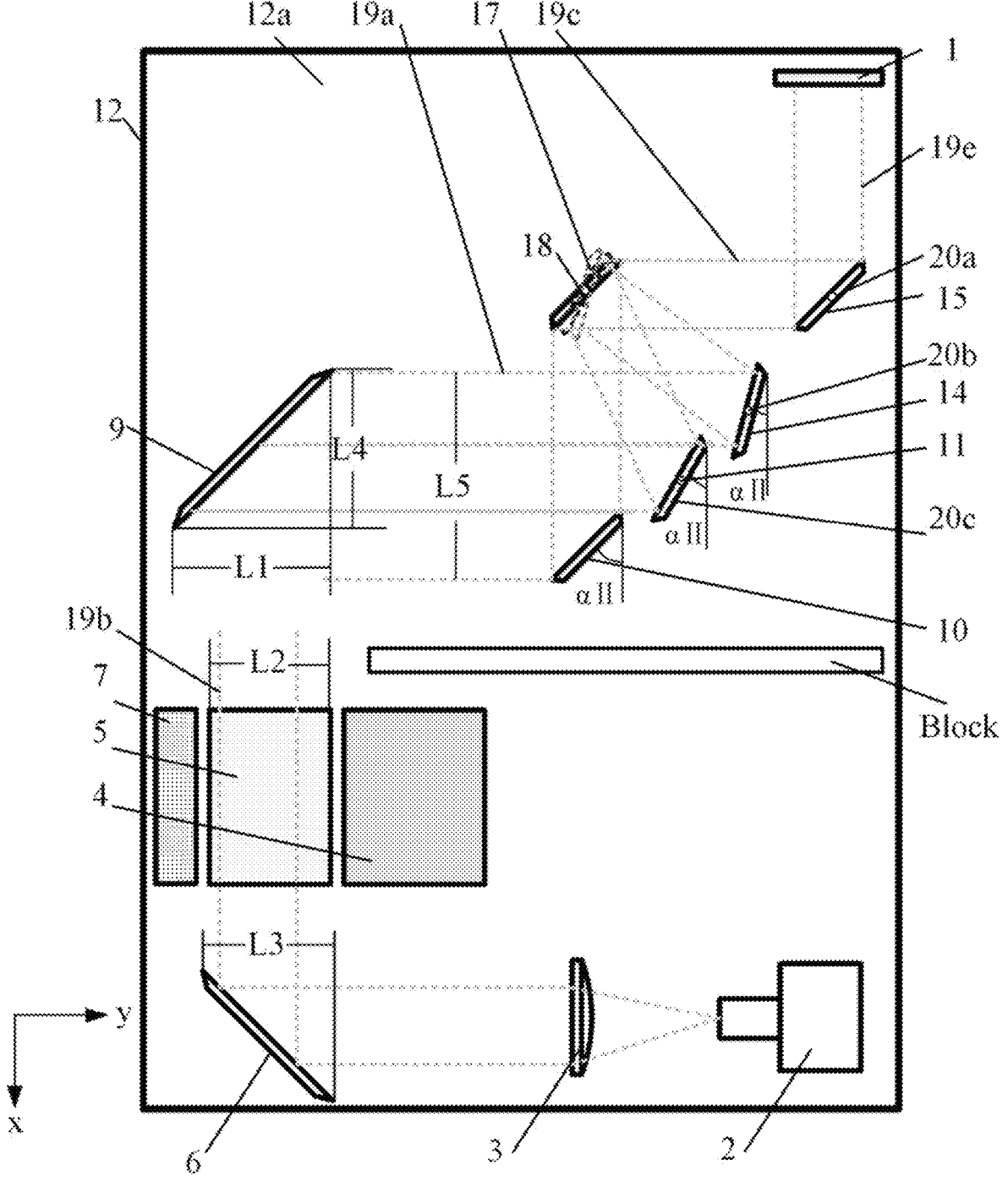
FIG. 7 is a second layout diagram of a reflector group in a schlieren system according to Example 2 of the present disclosure, where an optical path deflecting mirror is farther from a build platform than a reflector group in a left-right direction x.

In this example, the mounting plane of the reflector group on the bottom surface of the printing chamber 12 is taken as an example for further description, and the mounting plane of the reflector group can be on a left side or a right side of the build platform 5 in the powder scraping direction y, that is, a y-axis direction. In this example, the reflector group mounted on the left side of the build platform 5 is taken as an example for further description, as shown in FIGS. 6-7.

The optical path deflecting mirror 17 of the schlieren system is controlled by an optical path deflecting mirror galvanometer motor controller 25 to pivot around an axis 18 perpendicular to the mounting plane, the optical path deflecting mirror 17 is capable of being rotated to a position parallel to one of the reflectors (the fifth reflector 10, or the fourth reflector 11, or the second reflector 14) in the reflector group that has been pivoted to the guiding angle «II, and is configured to reflect an initial optical beam 19*c* from an optical source to the reflector parallel to the optical path deflecting mirror 17. As shown in FIG. 6 or 7, when any of the reflectors (the fifth reflector 10, or the fourth reflector 11, or the second reflector 14) is pivoted to the guiding angle αI, a distance from the axis 18 of the optical path deflecting mirror 17 to the build platform 5 in a direction of any of the guiding optical beams 19*a* is not great than a distance from a mirror surface emergent optical path center of any of the reflectors (the fifth reflector 10, or the fourth reflector 11, or the second reflector 14) to the build platform 5; and the optical path deflecting mirror galvanometer motor controller 25 is electrically connected to a synchronous controller 24, and the synchronous controller 24 is in signal connection with the laser path planner 23; after receiving the laser scanning path information, the synchronous controller 24 synchronously sends the same to the laser galvanometer motor controller 22 and the optical path deflecting mirror galvanometer motor controller 25, the laser galvanometer motor controller 22 then controls the laser emitter 13 to project the laser beam 21 to the designated position area on the build platform 5 and scan along the laser scanning path; and the optical path deflecting mirror galvanometer motor controller 25 makes the optical path deflecting mirror 17 deflected to a working position where a mirror surface of the same is parallel to one of the reflectors in the reflector group that has been pivoted to the guiding angle αII, such that the guiding optical beam 19*a* is reflected by the fifth plane mirror 9 and then passes through the designated position area, where the guiding optical beam 19*a* is reflected by the reflector that is parallel to the mirror surface of the optical path deflecting mirror 17 and has been pivoted to the guiding angle «II.

The initial optical beam 19*c* from the optical source is provided by an optical source system consisting of an optical point source 16, a concave mirror 1 and a first plane mirror 15. As shown in FIG. 6 or 7, the concave mirror 1 is irradiated by a conical optical beam 19*d* emitted from the optical point source 16, after being reflected by the concave mirror 1, the conical optical beam 19*d* is converted into a parallel optical beam 19*e* in the left-right direction x, and reflected by the first plane mirror 15 to the optical path deflecting mirror 17, then irradiated by the optical path deflecting mirror 17 to any one of the reflectors (the fifth reflector 10, or the fourth reflector 11, or the second reflector 14, and the optical beam that the light irradiates on the fourth reflector 11, or the second reflector 14 is not shown in the figure) that has been pivoted to the guiding angle αII, such that translation of the optical path is achieved; and after reaching the fifth plane mirror 9, the guiding optical beam 19*a* turns its direction and passes through the sputtering area, and the sixth plane mirror 6 reflects the schlieren optical beam 19*b* to make the same vertically pass through the lens group 3, making it focused and captured by the camera 2. The schlieren optical beams 19*b* that all of the reflectors reflect to the fifth plane mirror 9, and then to the sputtering area are distributed continuously in the powder scraping direction y. The initial optical beam 19*c* from the optical source can also be irradiated onto the lens group by the conical optical beam emitted from the optical point source 16, and then directly irradiated onto the optical path deflecting mirror 17 in a direction of any of the guiding optical beams 19*a* of the reflector group.

The parallel optical beam 19*e* emitted from the concave mirror 1 and the initial optical beam 19*c* incident on the optical path deflecting mirror 17 are symmetrical relative to a mirror surface normal vector of the first plane mirror 15. A straight-line distance between the optical point source 16 and the concave mirror 1 is a focal length of the concave mirror 1, and the camera 2 is mounted behind a focal point of the lens group 3. The guiding optical beam 19*a* and the schlieren optical beam 19*b* are symmetrical relative to a normal vector of the mirror surface of the fifth plane mirror 9; when the fifth reflector 10, the fourth reflector 11, and the second reflector 14 are pivoted to the guiding angle αII, the angle αII between the reflector surface of each of the reflectors and the left-right direction x is greater than 0° but less than and equal to 45°; when the angle between the fifth reflector 10 and the left-right direction x is equal to 45°, the distance from the axis 18 of the optical path deflecting mirror 17 to the build platform 5 in the direction of any of the guiding optical beams 19*a* of the fifth plane mirror 9 is equal to the distance from a mirror surface emergent optical path center of the fifth reflector 10 to the build platform 5, such that the guiding optical beam 19*a* of the fifth reflector 10 is parallel to the powder scraping direction y and can completely pass through the sputtering area after being reflected by the fifth plane mirror 9; when the angles between the fourth reflector 11, as well as the second reflector 14, and the left-right direction x are less than 45°, a difference between a projection distance from mirror surface emergent optical path centers of the fourth reflector 11 or the second reflector 14 to an extension part of the build platform 5 in the powder scraping direction y, as well as the axis 18 of the optical path deflecting mirror 17 in the directions of the guiding optical beams 19*a* of the fourth reflector 11 or the second reflector 14, and to the build platform 5 in an extension part of the powder scraping direction y, is denoted as H, and a distance from the guiding optical beams 19*a* passing through the mirror surface emergent optical path center of the fourth reflector 11 or the second reflector 14 to the initial optical beam 19*c* passing through the mirror surface emergent optical path center of the optical path deflecting mirror 17 is denoted as D, where H, D, and all satisfy the following formula: $H=D/\tan 2\alpha II$.

The guiding angles αII of the fifth reflector 10, the fourth reflector 11, and the second reflector 14 are sorted in descending order, distances from the mirror surface emergent optical path centers of the fifth reflector 10, the fourth reflector 11, and the second reflector 14 to the xz plane are sorted in ascending order, and a project length L5 of a union set of the guiding optical beams 19*a* reflected by all of the reflectors in the left-right direction is not less than the projection length L4 of the fifth plane mirror 9. As shown in FIG. 6, when being observed in the left-right direction x, the extension part of build platform 5 in the powder scraping direction y on the bottom surface 12*a* is farther away from the reflector group than that of the axis 18 of the optical path deflecting mirror 17; and as shown in FIG. 7, when being observed in the left-right direction x, the extension part of build platform 5 in the powder scraping direction y on the bottom surface 12*a* is closer to the reflector group than that of the axis 18 of the optical path deflecting mirror 17.

In this example, the second reflector 14, the third reflector 11, and the fourth reflector 10 can be configured to pivot around pivot axes (20*a*, 20*b*, 20*c*) perpendicular to the mounting plane.

Specifically, a method for in-situ/online monitoring of spatter in a large-area melt pool by the schlieren system includes the following steps:

step 1. angles of the concave mirror 1 and the optical point source 16 are adjusted until the direction of the parallel optical beam 19*e* emitted from the concave mirror 1 is same as a x-axis direction;

step 2. the first plane mirror 15, the second reflector 14, a third reflector 11, the fourth reflector 10, and the optical path deflecting mirror 17 are mounted according to the requirements in Example 2; and the mirror surface normal vector of the first plane mirror 15 has an angle of 45° with the positive y-axis direction, the mirror surfaces of the second reflector 14, the third reflector 11, and the fourth reflector 10 that have been pivoted to the guiding angle αII have angles of 15°, 30° and 45° respectively with a y-axis direction, and directions of the guiding optical beams 19*a* reflected by the second reflector 14, the third reflector 11, and the fourth reflector 10 are the same as the negative y-axis direction;

step 3. the fifth plane mirror 9 is mounted according to the requirements in Example 2;

step 4. the sixth plane mirror 6 is mounted according to the requirements in Example 2;

step 5. the lens group 3 is mounted according to the requirements in Example 2; and step 6. the camera 2 is mounted according to the requirements in Example 2.

the optical path deflecting mirror galvanometer motor controller 25 is configured to search for and identify any of the reflectors in the reflector group, when being pivoted to the guiding angle αII, the any of the identified reflectors is capable of enabling the guiding optical beams 19*a* after being reflected by the fifth plane mirror 9 to pass through the designated position area corresponding to the laser scanning path; the optical path deflecting mirror galvanometer motor controller 25 then controls the any of the identified reflectors to be pivoted to the guiding angle, and sends a motor rotation instruction according to a difference between a complementary angle of the guiding angle αII of the any of the identified reflectors and an angle of the mirror surface of the optical path deflecting mirror 17 relative to a direction of any of the guiding optical beams, such that the optical path deflecting mirror 17 is pivoted to be parallel to the mirror surface of the any of the identified reflectors being pivoted to the guiding angle αII.

In this example, as shown in FIGS. 6-7, a specific implementation route of optical path translation includes:

1) the fourth reflector 10 covers a left area of the build platform 5 (a side of the build platform close to the scraper is denoted as the left area), the optical path deflecting mirror

17 is rotated to form an angle of 45° with the yz plane, a mirror surface of the fourth reflector 10 forms an angle of 45° with the yz plane, and mirror surfaces of the second reflector 14 and the third reflector 11 are parallel to the yz plane.

2) The third reflector 11 covers a middle area of the build platform, the optical path deflecting mirror 17 is rotated to form an angle of 60° with the yz plane, the mirror surface of the third reflector 11 forms an angle of 60° with the yz plane, and the mirror surfaces of the second reflector and the fourth reflector are parallel to the yz plane.

3) The second reflector 14 covers a right area of the build platform (a side of the build platform away from the scraper is denoted as the right area), the optical path deflecting mirror 17 is rotated to form an angle of 75° with the yz plane, the mirror surface of the second reflector 14 forms an angle of 75° with the yz plane, and mirror surfaces of the third reflector 11 and the fourth reflector 10 are parallel to the yz plane.

4) As shown in FIGS. 6-7, the three sets of parallel optical paths should have an overlapping area.

Pivots of the second reflector 14, the third reflector 11, the fourth reflector 10, and the optical path deflecting mirror 17 are automatically controlled by the optical path deflecting mirror galvanometer motor controller.

During the implementation of the schlieren system, a light-proof shield is arranged inside the printing chamber 12, so as to avoid mutual interference among the optical source system, the reflector group and the lens group, as shown in FIG. 6.

In this example, the mounting plane in on the left side on the build platform 5 in the powder scraping direction, that is, the y-axis direction, and the optical path deflecting mirror 17 is farther away from the build platform 5 in the x-direction than that of the reflector group, as shown in FIG. 7. Specific steps for the experimental method and the implementation route of optical path translation will not be repeated herein, which does not affect the arrangement, realization, and understanding of the schlieren system. As can be seen from FIG. 7, the printing chamber needs a larger space for implementation, and it is also necessary to arrange the shield inside the printing chamber to prevent the optical path from being disturbed by the reflectors during propagation. Therefore, it can be seen that the arrangement of the schlieren system in Example 1 is better.

In this example, a limited space in the printing chamber is fully utilized, a movable schlieren optical path without disturbing the inherent devices in the printing chamber (such as the scraping scraper) is arranged in the printing chamber, which overcomes the limitations of traditional schlieren optical paths and enabling the large-area monitoring of sputtering, plumes, and other phenomena, during multilayer printing of the selective laser melting.

Example 3

Based on the device structure in Example 1, this example makes further improvements in automatic control part of Example 1.

The improvements include: the synchronous controller 24 is connected to the laser galvanometer motor controller 22 and the optical path deflecting mirror galvanometer motor controller 25, and is configured to synchronously trigger the laser emitter 13 and the optical path deflecting mirror 17 to perform a specified action, and the synchronous controller 24 communicates with the laser galvanometer motor controller 22 and the optical path deflecting mirror galvanometer motor controller 25 using a TCP protocol.

Specifically, implementation logic for the method for in-situ/online monitoring of spatter in a large-area melt pool by the schlieren system is as follows:

1) a selective laser melting build equipment is started, the laser scanning path pre-defined by the computer in the build equipment is sent to a laser path controller;

2) the laser path controller sends laser path data to the laser galvanometer motor controller and the optical path deflecting mirror galvanometer motor controller via the synchronous controller at the same time;

3) the laser path controller sends a control instruction according to laser path coordinates to control the laser galvanometer motor controller to drive the laser emitter 13 to deflect, and the conversion of the laser path coordinates to the control instruction is inherent technology of the selective laser melting build platform and will not be further elaborated; and 4) the optical path deflecting mirror galvanometer motor controller 25 controls the identified reflector to be pivoted to the guiding angle αI according to the monitored area covered by the laser path of the reflector on the laser path coordinates in the powder scraping direction y, and the optical path deflecting mirror galvanometer motor controller 25 sends a motor rotation instruction according to a difference between a complementary angle of the identified guiding angle αI and an angle of the optical path deflecting mirror 17 relative to a direction of any of the guiding optical beams, to make the difference tend to zero, such that the optical path deflecting mirror 17 is pivoted to be parallel to the mirror surface of the identified reflector being pivoted to the guiding angle αI, and precise automatic control of the optical path deflecting mirror is achieved.

Specifically, the laser emitter 13 continuously deflects, and the optical path deflecting mirror 17 deflects only after specified conditions are satisfied.

In this preferred embodiment, the synchronous controller triggers the laser emitter 13 and the optical path deflecting mirror 17 simultaneously to perform the specified action, which is conducive to ensuring that the monitored area accurately tracks the melt pool.

The above specification describes one of the preferred embodiments of the present disclosure and should not be construed as a limitation on the protection scope of the claims of the present disclosure. Without departing from the principles and spirit of the present disclosure, any modifications, equivalent substitutions, and improvements shall fall within the protection scope of the claims of the present disclosure.

What is claimed is:

1. A schlieren system for in-situ/online monitoring of a spatter in a large-area melt pool, wherein the schlieren system is configured to monitor spatter phenomena in the large-area melt pool on a selective laser melting build workbench, the selective laser melting build workbench comprising a powder reservoir (4), a build platform (5), and a powder collection bin (7) arranged in sequence on a bottom surface (12a) of a printing chamber (12) in a powder scraping direction y, as well as a laser emitter (13) arranged above the build platform (5), the laser emitter (13) is configured to be controlled by a laser galvanometer motor controller (22), and to project an emitted laser beam (21) onto a designated position area of the build platform (5) according to laser scanning path information outputted from a laser path planner (23), and to scan along a laser scanning path; and the schlieren system comprising an optical source for generating an initial optical beam (19c), and an optical beam guiding system comprising a plane mirror designated as a fifth plane mirror (9), an optical path deflecting mirror (17), and a reflector group; wherein the fifth plane mirror (9) is configured to guide any of guiding optical beams (19a) reflected by the reflector group, and after the any of the guiding optical beams reflected by the reflector group has been reflected by the fifth plane mirror (9), schlieren optical beams (19b) are formed, wherein the schlieren optical beams pass through a sputtering area in close proximity to an upper surface of the build platform (5) in a left-right direction x and reach a sixth plane mirror (6), wherein the left-right direction x is perpendicular to the powder scraping direction y and parallel to the bottom surface; a projection length of the fifth plane mirror (9) in the powder scraping direction y is denoted as L1, wherein L1 is greater than or equal to a length L2 of the sputtering area in the powder scraping direction y; the sixth plane mirror (6) is configured to guide the schlieren optical beams (19b) to be reflected to a lens group (3) and focus on a camera (2), a projection length L3 of the sixth plane mirror (6) in the powder scraping direction y is greater than or equal to L2, and the fifth plane mirror (9) and the sixth plane mirror (6) are respectively arranged on a left/right side of the build platform (5) in the left-right direction x;

the reflector group comprises at least two reflectors configured to pivot to change directions of the at least two reflectors, the at least two reflectors are arranged on a mounting plane, and mirror surfaces of the at least two reflectors are configured to pivot around pivot axes perpendicular to the mounting plane; the at least two reflectors, the optical path deflecting mirror (17), and the fifth plane mirror (9) are arranged on an identical side of the build platform (5), and when the at least two reflectors are pivoted to a guiding angle, the mirror surfaces of the at least two reflectors face the optical path deflecting mirror (17) and direct reflected optical beams toward the fifth plane mirror (9), and the guiding optical beams (19a) reflected by the at least two reflectors to the fifth plane mirror (9) are parallel;

the optical path deflecting mirror (17) is configured to be pivotable around an axis (18) perpendicular to the mounting plane to a working position relatively parallel to one of the at least two reflectors in the reflector group, wherein the one of the at least two reflectors in the reflector group has been pivoted to the guiding angle, wherein the initial optical beam (19c) is reflected to the one of the at least two reflectors in the reflector group, and a projection distance from the axis (18) of the optical path deflecting mirror (17) to the build platform (5) in a direction of the any of the guiding optical beams (19a) is less than or equal to a projection distance from a pivot axis of any of the at least two reflectors to the build platform (5); and a synchronous controller (24), wherein the synchronous controller (24) is in a signal connection with the laser path planner (23); after receiving the laser scanning path information, the synchronous controller synchronously sends the laser scanning path information to the laser galvanometer motor controller (22) and an optical path deflecting mirror galvanometer motor controller (25), and the optical path deflecting mirror galvanometer motor controller (25) being configured to pivot a mirror surface of the optical path deflecting mirror (17) to the working position, wherein the any of the guiding optical beams (19a) reflected by the at least two reflectors is reflected by the fifth plane mirror (9) and passes through the designated position area, wherein the at least two reflectors are pivoted to the guiding angle; wherein the at least two reflectors are arranged in a following manner according to a position of the mounting plane:

the mounting plane is a side wall (12b) of the printing chamber (12) on a left or right side adjacent to the fifth plane mirror (9) in the powder scraping direction y, the side wall is parallel to the powder scraping direction y and forms an inclination angle greater than 0° but less than 180° with the bottom surface (12a), wherein the guiding angle is an angle αI of the mirror surface of each of the at least two reflectors pivoted to the powder scraping direction y, wherein the angle αI is greater than 0° but less than or equal to 45°; and an order of the guiding angles of the mirror surfaces of the at least two reflectors is opposite to an order of projection distances from the pivot axes of the at least two reflectors along the guiding optical beams (19a) to the bottom surface; a projection length of a union set of the guiding optical beams (19a) in the powder scraping direction y is greater than or equal to L1; when observing in the powder scraping direction y, projection distances from the pivot axes of the at least two reflectors to an extension surface of the powder collection bin (7) in the left-right direction x are less than projection distances from the axis (18) to the extension surface of the powder collection bin (7) in the left-right direction x; when observing in the direction of the any of the guiding optical beams, projection distances from the pivot axes of the at least two reflectors to the build platform (5) are greater than or equal to the projection distance from the axis (18) of the optical path deflecting mirror (17) to the build platform (5), a mirror surface of the fifth plane mirror (9) is parallel to the powder scraping direction y, and the guiding optical beams (19a) and the schlieren optical beams (19b) are symmetrical relative to a normal vector of the mirror surface of the fifth plane mirror (9); and the mounting plane is the bottom surface, the mirror surface of the fifth plane mirror (9) is perpendicular to the bottom surface, and the guiding optical beams (19a) and the schlieren optical beams (19b) are symmetrical relative to the normal vector of the mirror surface of the fifth plane mirror (9), and the direction of the any of the guiding optical beams is identical to the powder scraping direction y, the guiding angle is an angle αII of a mirror surface of each of the at least two reflectors pivoted to the left-right direction x, wherein the angle αII is greater than 0° but less than or equal to 45°; an order of the guiding angles of the mirror surfaces of the at least two reflectors is opposite to an order of projection distances from the pivot axes of the at least two reflectors along the guiding optical beams (19a) to an extension body of the build platform (5) in the left-right direction x, and a projection length of a union set of the guiding optical beams (19a) onto the fifth plane mirror (9) in the left-right direction x is greater than or equal to a projection length L4 of the fifth plane mirror (9) in the left-right direction x; in the direction of the any of the guiding optical beams, a projection distance from the extension body of the build platform (5) in the left-right direction x to the pivot axes of the at least two reflectors is greater than or equal to a projection distance from the extension body of the build platform (5) in the left-right direction x to the axis (18) of the optical path deflecting mirror (17); when being observed in the left-right direction x, an extension part of the build platform in the powder scraping direction y on the bottom surface is farther away from the reflector group, but the extension part of the build platform (5) in the powder scraping direction y on the bottom surface is more adjacent to the axis (18) of the optical path deflecting mirror (17); or when being observed in the left-right direction x, the extension part of the build platform in the powder scraping direction y on the bottom surface is more adjacent to the reflector group, but the extension part of the build platform (5) in the powder scraping direction y on the bottom surface is farther away from the axis (18) of the optical path deflecting mirror (17);

the optical path deflecting mirror galvanometer motor controller (25) is configured to control a selected one of the at least two reflectors in the reflector group, when being pivoted to the guiding angle, the selected reflector is configured so that the guiding optical beams (19a) after being reflected by the fifth plane mirror (9) are directed to pass through the designated position area corresponding to the laser scanning path; the optical path deflecting mirror galvanometer motor controller (25) controls the selected reflector to be pivoted to the guiding angle, and sends a motor rotation instruction according to a difference between a complementary angle of a guiding angle of the selected reflector and an angle of the mirror surface of the optical path deflecting mirror (17) relative to a direction of the any of the guiding optical beams, wherein the optical path deflecting mirror (17) is pivoted to be parallel to a mirror surface of the selected reflector being pivoted to the guiding angle.

2. The schlieren system for the in-situ/online monitoring of the spatter in the large-area melt pool according to claim 1, wherein a direction of an initial optical beam (19c) incident on the optical path deflecting mirror (17) is parallel to the guiding optical beams (19a) reflected by the at least two reflectors.

3. The schlieren system for the in-situ/online monitoring of the spatter in the large-area melt pool according to claim 1, wherein light from the optical source is provided by an optical source (16) system consisting of an optical point source, a concave mirror (1), and a first plane mirror (15), and light emitted from the optical point source (16) reaches the optical path deflecting mirror (17) after being reflected by the concave mirror (1) and the first plane mirror (15).

4. The schlieren system for the in-situ/online monitoring of the spatter in the large-area melt pool according to claim 3, wherein a straight-line distance between the optical point source (16) and the concave mirror (1) is a focal length of the concave mirror (1).

5. The schlieren system for the in-situ/online monitoring of the spatter in the large-area melt pool according to claim 1, wherein the camera (2) is mounted behind a focal point of the lens group (3).

6. The schlieren system for the in-situ/online monitoring of the spatter in the large-area melt pool according to claim 1, wherein when the side wall is parallel to the powder scraping direction y and perpendicular to the bottom surface, angles between the mirror surface of the fifth plane mirror (9) relative to the side wall and the bottom surface are both 45°, the fifth plane mirror (9) is abutted against the side wall, and the guiding optical beams (19*a*) are perpendicular to the bottom surface.

7. The schlieren system for the in-situ/online monitoring of the spatter in the large-area melt pool according to claim 1, wherein angles between the mirror surface of the fifth plane mirror (9) relative to the left-right directions x, as well as the powder scraping direction y are both 45°, and the guiding optical beams (19*a*) are parallel to the powder scraping direction y.

8. The schlieren system for the in-situ/online monitoring of the spatter in the large-area melt pool according to claim 1, wherein the schlieren optical beams (19*b*) are distributed continuously in the powder scraping direction y.

9. The schlieren system for the in-situ/online monitoring of the spatter in the large-area melt pool according to claim 1, wherein when the angle αI between the mirror surface of the any of the at least two reflectors and the powder scraping direction y is equal to 45°, in the direction of the any of the guiding optical beams (19*a*), the projection distance from the axis (18) of the optical path deflecting mirror (17) to the build platform (5) is equal to the projection distance from the pivot axis of the any of the at least two reflectors to the build platform (5).

10. The schlieren system for the in-situ/online monitoring of the spatter in the large-area melt pool according to claim 1, wherein when the angle αI between the mirror surface of the any of the at least two reflectors and the powder scraping direction y is less than 45°, in the direction of the any of the guiding optical beams, a difference between the projection distance from the pivot axis of the any of the at least two reflectors to the build platform and the projection distance from the axis (18) of the optical path deflecting mirror (17) to the build platform (5) is denoted as H; and a difference in distance between the any of the guiding optical beams (19*a*) passing through a mirror surface emergent optical path center of the any of the at least two reflectors and the initial optical beam (19*c*) passing through a mirror surface emergent optical path center of the optical path deflecting mirror (17) is denoted as D, wherein H, D, and the angle αI satisfy a following formula:

$$H = \frac{D}{\tan 2\alpha I}.$$

11. The schlieren system for the in-situ/online monitoring of the spatter in the large-area melt pool according to claim 1, wherein when the angle αII between the mirror surface of the any of the at least two reflectors and the powder scraping direction y is equal to 45°, in the powder scraping direction y, the projection distance from the axis (18) of the optical path deflecting mirror (17) to the extension body of the build platform (5) in the left-right direction x is equal to the projection distance from the pivot axis of the any of the at least two reflectors to the extension body of the build platform (5) in the left-right direction x.

12. The schlieren system for the in-situ/online monitoring of the spatter in the large-area melt pool according to claim 1, wherein when the angle αII between the mirror surface of the any of the at least two reflectors and the powder scraping direction y is equal to 45°, in the powder scraping direction y, a difference between the projection distance from the pivot axis of the any of the at least two reflectors to the build platform and the projection distance from the axis (18) of the optical path deflecting mirror (17) to the build platform (5) in the left-right direction x is denoted as H; and a difference in distance between the any of the guiding optical beams (19*a*) passing through a mirror surface emergent optical path center of the any of the at least two reflectors and the initial optical beam (19*c*) passing through a mirror surface emergent optical path center of the optical path deflecting mirror (17) is denoted as D, wherein H, D, and the angle αII satisfy a following formula:

$$H = \frac{D}{\tan 2\alpha II}.$$

\*　　\*　　\*　　\*　　\*